United States Patent
Zhu et al.

(10) Patent No.: US 10,306,165 B2
(45) Date of Patent: May 28, 2019

(54) IMAGE GENERATING METHOD AND DUAL-LENS DEVICE

(71) Applicant: Huawei Device Co., Ltd., Shenzhen (CN)

(72) Inventors: Congchao Zhu, Beijing (CN); Xin Li, Hangzhou (CN); Wei Luo, Shanghai (CN)

(73) Assignee: Huawei Device Co., Ltd., Dongguan (CN)

( * ) Notice: Subject to any disclaimer, the term of this patent is extended or adjusted under 35 U.S.C. 154(b) by 185 days.

(21) Appl. No.: 15/102,226

(22) PCT Filed: Dec. 6, 2013

(86) PCT No.: PCT/CN2013/088783
§ 371 (c)(1),
(2) Date: Jun. 6, 2016

(87) PCT Pub. No.: WO2015/081563
PCT Pub. Date: Jun. 11, 2015

(65) Prior Publication Data
US 2017/0214866 A1    Jul. 27, 2017

(51) Int. Cl.
*H04N 5/359* (2011.01)
*H04N 5/265* (2006.01)
(Continued)

(52) U.S. Cl.
CPC ......... *H04N 5/359* (2013.01); *G02B 27/0018* (2013.01); *H04N 5/2258* (2013.01);
(Continued)

(58) Field of Classification Search
CPC ...... H04N 5/359; H04N 5/2258; H04N 5/265; G02B 27/0018
See application file for complete search history.

(56) References Cited

U.S. PATENT DOCUMENTS

| | | | |
|---|---|---|---|
| 6,611,289 B1 | 8/2003 | Yu et al. | |
| 2007/0025723 A1* | 2/2007 | Baudisch | G03B 13/02 396/287 |

(Continued)

FOREIGN PATENT DOCUMENTS

| | | |
|---|---|---|
| CN | 101365071 A | 2/2009 |
| CN | 101808250 A | 8/2010 |

(Continued)

OTHER PUBLICATIONS

Zhou, J. et al.; "Camera Array-Based HDR Image Synthesis Method," Application Research of Computers, Sep. 2013, pp. 1-4, vol. 30, No. 9.

*Primary Examiner* — Mekonnen D Dagnew
(74) *Attorney, Agent, or Firm* — Slater Matsil, LLP (57) ABSTRACT

Embodiments disclose an image generating method and a dual-lens device. The method includes determining a first processing parameter and a second processing parameter. The first processing parameter is different from the second processing parameter. The method also includes acquiring, according to the first processing parameter, a first image captured at a first moment by a first image sensor corresponding to a first lens, and acquiring, according to the second processing parameter, a second image captured at the first moment by a second image sensor corresponding to a second lens. When a photographing operation instruction is received, the acquired first image and the acquired second image are synthesized to generate an image.

19 Claims, 7 Drawing Sheets

Ghost B

Entity person A (51) Int. Cl.
  *H04N 5/225* (2006.01)
  *H04N 5/235* (2006.01)
  *H04N 9/09* (2006.01)
  *G02B 27/00* (2006.01)
  *H04N 13/239* (2018.01)
  *H04N 13/00* (2018.01)

(52) U.S. Cl.
  CPC ........... *H04N 5/2355* (2013.01); *H04N 5/265* (2013.01); *H04N 9/09* (2013.01); *H04N 13/239* (2018.05); *H04N 2013/0088* (2013.01)

(56) References Cited

U.S. PATENT DOCUMENTS

| | | | |
|---|---|---|---|
| 2008/0218613 A1 | 9/2008 | Janson et al. | |
| 2009/0086074 A1 | 4/2009 | Li et al. | |
| 2010/0134652 A1 | 6/2010 | Takane | |
| 2010/0157078 A1 | 6/2010 | Atanassov et al. | |
| 2011/0069200 A1 | 3/2011 | Oh et al. | |
| 2012/0008006 A1 | 1/2012 | Muramatsu | |
| 2012/0105579 A1* | 5/2012 | Jeon | H04N 5/2258 348/38 |
| 2012/0162366 A1 | 6/2012 | Ninan et al. | |
| 2012/0162379 A1 | 6/2012 | Dahi et al. | |
| 2012/0188392 A1 | 7/2012 | Smith | |
| 2012/0236168 A1 | 9/2012 | Tsutsumi | |
| 2013/0021447 A1* | 1/2013 | Brisedoux | H04N 5/2258 348/47 |
| 2013/0258139 A1 | 10/2013 | Omori | |
| 2014/0036040 A1 | 2/2014 | Takane | |

FOREIGN PATENT DOCUMENTS

| | | |
|---|---|---|
| CN | 102739949 A | 10/2012 |
| CN | 102892008 A | 1/2013 |
| JP | 2004120527 A | 4/2004 |
| JP | 2010130435 A | 6/2010 |
| JP | 2012019392 A | 1/2012 |
| JP | 2012124622 A | 6/2012 |
| JP | 2012195668 A | 10/2012 |
| JP | 2013078090 A | 4/2013 |
| WO | 2013173669 A1 | 11/2013 |

* cited by examiner

Ghost B

Entity person A

FIG. 1

Ghost B

Entity person A

IMAGE GENERATING METHOD AND DUAL-LENS DEVICE

CROSS-REFERENCE TO RELATED APPLICATIONS

This application is a National Stage of International Application No. PCT/CN2013/088783, filed on Dec. 6, 2013, which is hereby incorporated by reference in its entirety.

TECHNICAL FIELD

The present invention relates to the field of image processing technologies, and in particular, to an image generating method and a dual-lens device.

BACKGROUND

Currently, in comparison with an image obtained by means of conventional photographing, multiple frames of LDR (Low Dynamic Range, low dynamic range imaging) images having different exposure are synthesized by using an HDR (High Dynamic Range, high dynamic range imaging) image, so that a wider dynamic range and more image details can be provided, and a visual effect in a real environment can be better reflected. Therefore, this technology is widely applied to a Camera photographing field of a smart terminal.

Figure 1:
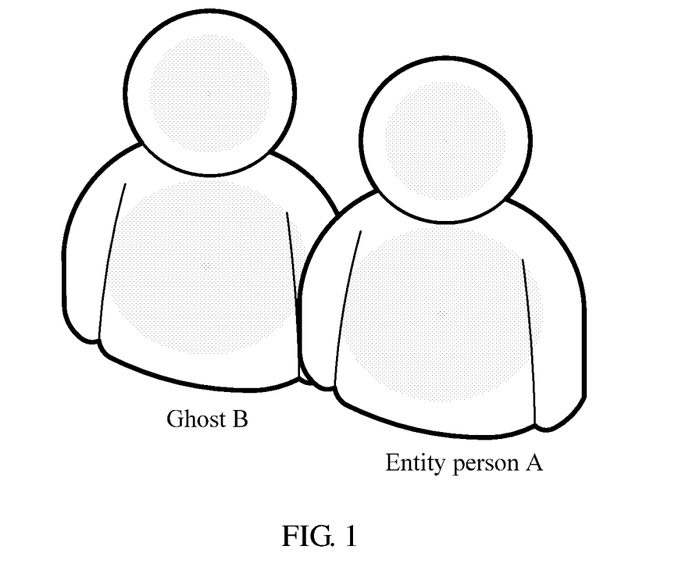
FIG. 1 is a schematic diagram of a "ghost" phenomenon in the prior art.

Because multiple frames of images having different exposure need to be captured in an HDR technology, and due to a limitation of a maximum frame rate of a Camera photographing system, there is a photographing time interval between these multiple frames of images. Within the time interval, if a hand trembles or an object in a scene moves, where for example, the wind blows a branch and a person walks, image content in these images change, and a "ghost" phenomenon occurs during image synthesis. Generally, ghost often occurs in a photo, and is most common especially during backlight photographing. In an optical imaging system, one or more images similar to an image point exist around the image point, and other image points except the image point are collectively referred to as "ghost". For example, in FIG. 1, an image on the right in FIG. 1 is an entity person A during normal photographing, and an image on the left is ghost B that appears. For photographing a fast-moving scene, this phenomenon is especially obvious. Therefore, how to eliminate "ghost" becomes one of difficulties in the HDR technology, and has great importance to quality of an HDR image.

To eliminate "ghost", the prior art has the following two methods:

Method 1: On a Camera component, different exposure is used for sensing units in alternate rows and/or columns, and then HDR is obtained by using a digital interpolation technology and an image fusion algorithm.

In this solution, a "ghost" problem can be well resolved, but because exposure in alternate rows/columns and digital interpolation are used, image resolution is relatively low.

Method 2: Before the image fusion algorithm is used, an image registration algorithm and a deghosting algorithm are added, so that impact of a hand tremble and a scene motion on image fusion is reduced.

Figure 2:
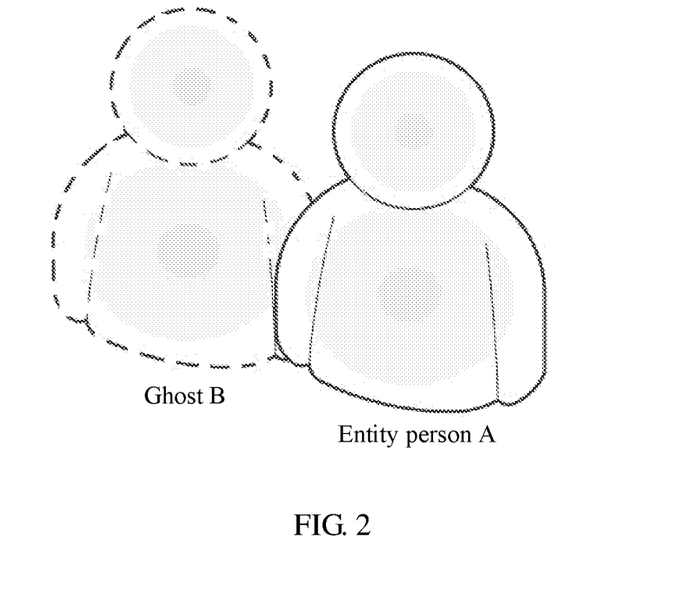
FIG. 2 is a schematic diagram in which a mistake appears during "ghost" resolving in the prior art.

In this solution, the ghost problem can be improved to some degree. However, algorithm complexity is increased, and in some scenarios, the registration algorithm and the deghosting algorithm fail or a mistake is introduced, and "ghost" in the HDR image cannot be well eliminated. As shown in FIG. 2, in addition to the entity person A, the ghost B still exists.

In conclusion, there is still no relatively good method for eliminating "ghost" in an HDR image in the prior art.

Therefore, a technical problem existing in the prior art is that when a hand trembles and/or an object in a scene moves during photographing, a "ghost" phenomenon exists in a high dynamic range image generated by fusing multiple frames of time-division images.

SUMMARY

The present invention provides an image generating method and a dual-lens device, which are used to resolve a problem in the prior art that when a hand trembles and/or an object in a scene moves during photographing, a "ghost" phenomenon exists in a high dynamic range image generated by fusing multiple frames of time-division images.

According to a first aspect, an image generating method is described, where the method is applied to a dual-lens device, and the dual-lens device includes a first lens and a second lens that are disposed on a same plane of the dual-lens device. The method includes: determining a first processing parameter and a second processing parameter, where the first processing parameter is different from the second processing parameter. The method also includes acquiring, according to the first processing parameter, a first image captured at a first moment by a first image sensor corresponding to the first lens, and acquiring, according to the second processing parameter, a second image captured at the first moment by a second image sensor corresponding to the second lens. When a photographing operation instruction is received, the method includes synthesizing the acquired first image and the acquired second image to generate an image.

With reference to the first aspect, in a first possible implementation manner, the determining a first processing parameter and a second processing parameter includes: receiving a user instruction, and pre-setting the first processing parameter and the second processing parameter; or determining the first processing parameter according to a result of image scene identification that is performed before the first image is acquired, and determining the second processing parameter according to a result of image scene identification that is performed before the second image is acquired, where the first processing parameter includes first exposure or first light sensitivity, and the second processing parameter includes second exposure or second light sensitivity, where the first exposure is different from the second exposure, and the first light sensitivity is different from the second light sensitivity.

With reference to the first aspect and the first possible implementation manner, in a second possible implementation manner, before the synthesizing a processed first image and a processed second image to generate an image, the method further includes: obtaining a panning amount between the processed first image and the processed second image; selecting the processed first image as a reference image; and performing a panning operation on the processed second image according to the panning amount, and determining an area of a common image of the processed first image and the processed second image.

With reference to the second possible implementation manner, in a third possible implementation manner, the obtaining a panning amount between the processed first image and the processed second image is specifically:

obtaining the panning amount based on (f×(t/d))/u, where L represents the panning amount between the processed first image and the processed second image, f represents a focal length, t represents an optical center distance between the first lens and the second lens, d represents a pixel size of the first image, where the pixel size of the first image is the same as a pixel size of the second image, and u represents a depth of field.

With reference to the second possible implementation manner, in a fourth possible implementation manner, after the determining an area of a common image of the processed first image and the processed second image, the method further includes: cropping areas of the processed first image and the processed second image on a basis of the common image, and obtaining the cropped first image and the cropped second image.

With reference to the second possible implementation manner, in a fifth possible implementation manner, the synthesizing the acquired first image and the acquired second image to generate an image is specifically: synthesizing the processed first image and the processed second image according to the area of the common image of the processed first image and the processed second image, to generate the image.

According to a second aspect, a dual-lens device is described, where the dual-lens device includes a first lens and a second lens that are disposed on a same plane of the dual-lens device, and the dual-lens device further includes a processor, a first image sensor corresponding to the first lens, and a second image sensor corresponding to the second lens. The processor is configured to determine a first processing parameter and a second processing parameter, where the first processing parameter is different from the second processing parameter. The first image sensor corresponding to the first lens is configured to acquire, according to the first processing parameter, a first image captured at a first moment by the first image sensor corresponding to the first lens. The second image sensor corresponding to the second lens is configured to acquire, according to the second processing parameter, a second image captured at the first moment by the second image sensor corresponding to the second lens. The processor is further configured to: when a photographing operation instruction is received, synthesize the acquired first image and the acquired second image to generate an image.

With reference to the second aspect, in a first possible implementation manner, the processor is specifically configured to receive a user instruction, and preset the first processing parameter and the second processing parameter; or is specifically configured to determine the first processing parameter according to a result of image scene identification that is performed before the first image is acquired, and determine the second processing parameter according to a result of image scene identification that is performed before the second image is acquired, where the first processing parameter includes first exposure or first light sensitivity, and the second processing parameter includes second exposure or second light sensitivity, where the first exposure is different from the second exposure, and the first light sensitivity is different from the second light sensitivity.

With reference to the first possible implementation manner, in a second possible implementation manner, the processor includes a central processing unit or an image signal processor.

With reference to the first possible implementation manner, in a third possible implementation manner, the processor includes the central processing unit or the image signal processor.

With reference to the second aspect, the first possible implementation manner, the second possible implementation manner, and the third possible implementation manner, in a fourth possible implementation manner, the processor is further configured to obtain a panning amount between the processed first image and the processed second image; select the processed first image as a reference image; and perform a panning operation on the processed second image according to the panning amount, and determine an area of a common image of the processed first image and the processed second image.

With reference to the fourth possible implementation manner, in a fifth possible implementation manner, the processor is further configured to synthesize the processed first image and the processed second image according to the area of the common image of the processed first image and the processed second image, to generate the image.

One or more technical solutions of the foregoing technical solutions have the following technical effects or advantages:

In the present invention, a dual-lens device is used to resolve a ghost problem, and because the dual-lens device includes a first lens and a second lens that are disposed on a same plane of the dual-lens device, when images are simultaneously captured, no ghost caused by a hand tremble and/or a relative motion of an object in a scene occurs in a captured first image and a captured second image. Therefore, a technical problem of "ghost" caused when images are synthesized by using a time-division multi-frame synthesis algorithm is resolved, which has great importance to improving an HDR effect.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

To resolve a problem in the prior art that when a hand trembles and/or an object in a scene moves during photographing, a "ghost" phenomenon exists in a high dynamic range image generated by fusing multiple frames of time-division images, the embodiments of the present invention provide an image generating method and a dual-lens device, and a general idea of the technical solutions in the embodiments of the present invention is as follows:

In the present invention, a dual-lens device is used to resolve a ghost problem, and the dual-lens device includes a first lens and a second lens that are disposed on a same plane of the dual-lens device. Due to this dual-lens design, when images are simultaneously captured, no ghost caused by a hand tremble and/or a relative motion of an object in a scene occurs in a captured first image and a captured second image. Therefore, a technical problem of "ghost" caused when images are synthesized by using a time-division multi-frame synthesis algorithm is resolved, which has great importance to improving an HDR effect.

The image generating method provided in the embodiments of the present invention may be applied to various terminal devices, and the terminal devices may include mobile terminal devices such as a mobile phone and a PAD.

Figure 3:
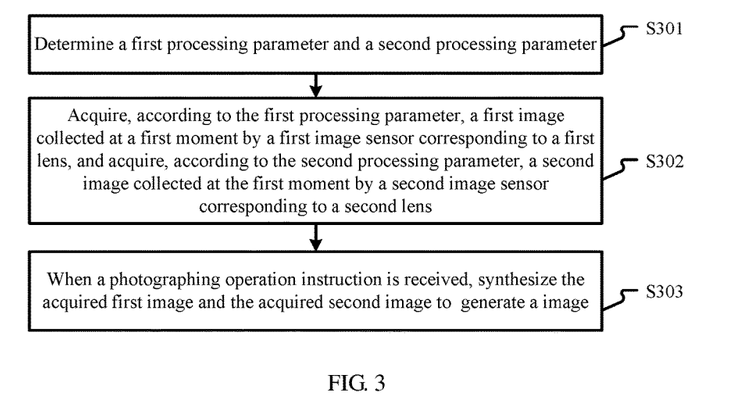
FIG. 3 is a flowchart of an image generating method according to an embodiment of the present invention.

FIG. 3 is a flowchart of an image generating method according to an embodiment of the present invention, and the image generating method is put forward. The image generating method is applied to a terminal device having dual lenses, and the dual-lens terminal device includes a first lens and a second lens that are disposed on a same plane of the dual-lens device. One of the two lenses of the dual-lens device may be a front-facing lens, and the other may be a rear-facing lens. According to a requirement of a user, one of the two lenses may be flipped so that this lens and the other lens are located on a same plane, so as to ensure images having same content are photographed. Optical axes of the two lenses of the dual-lens device are parallel and are fixedly connected, and the optical axes are parallel to ensure that a movement between a captured first image and a captured second image is a panning movement, where the panning movement can be corrected and a calculation amount is small. If the optical axes of the two lenses are not parallel, images are distorted and covered between each other, and correction is complex, thereby causing "ghost" to be generated when images are synthesized by using a multi-frame algorithm.

As shown in FIG. 3, the image generating method includes the following steps.

S301. Determine a first processing parameter and a second processing parameter.

The first processing parameter is different from the second processing parameter.

S302. Acquire, according to the first processing parameter, a first image captured at a first moment by a first image sensor corresponding to the first lens, and acquire, according to the second processing parameter, a second image captured at the first moment by a second image sensor corresponding to the second lens.

S303. When a photographing operation instruction is received, synthesize the acquired first image and the acquired second image to generate an image.

Figure 4:
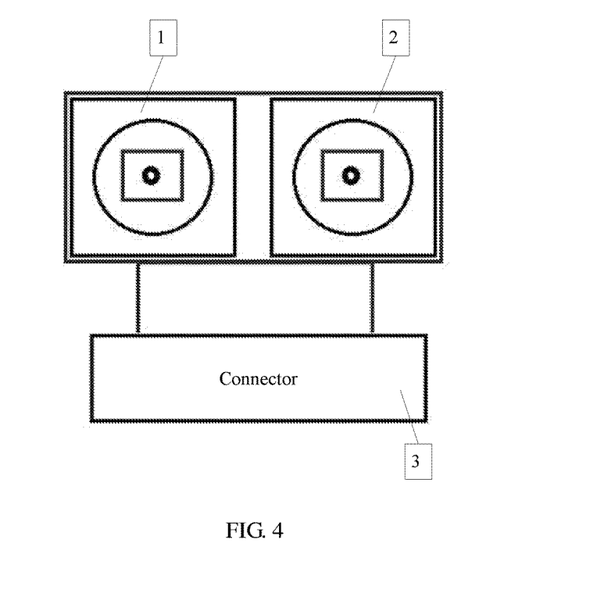
FIG. 4 is a schematic diagram of dual lenses according to an embodiment of the present invention.

FIG. 4 is a schematic diagram of dual lenses according to an embodiment of the present invention.

As shown in FIG. 4, two lenses are disposed side by side. A lens on the left is a first lens 1, and a lens on the right is a second lens 2. The two lenses are fixedly connected together by a connector 3, and optical axes of the two lenses are parallel. An advantage of a fixed connection lies in that it is ensured that relative positions of the two lenses do not change even if the two lenses are dropped down and squeezed in a process in which a user uses the two lenses.

In a process of implementing S301, the first processing parameter is different from the second processing parameter.

The first processing parameter includes first exposure or first light sensitivity, and the second processing parameter includes second exposure or second light sensitivity, where the first exposure is different from the second exposure, and the first light sensitivity is different from the second light sensitivity.

If exposure is used as an example, and assuming that the first exposure is set to +2 ev, the second exposure may be set to −2 ev.

In another process of implementing the present invention, the first processing parameter and the second processing parameter may be determined by an electronic device such as a mobile phone, a tablet, or a single-lens reflex camera in the following manners:

Manner 1: A user instruction is received, and the first processing parameter and the second processing parameter are preset. In this method, exposure required by the two lenses is manually set by default, such as +2 ev and −2 ev.

Manner 2: The first processing parameter is determined according to a result of image scene identification that is performed before the first image is acquired, and the second processing parameter is determined according to a result of image scene identification that is performed before the second image is acquired.

Specifically, the first image is used as an example. Before the first image is acquired, a preview image is photographed in advance by using the first lens. Then, exposure that is set when the preview image is photographed by using the first lens is analyzed on a basis of image scene identification of the preview image. According to a result, obtained by means of analysis, of image scene identification that is performed before the first image, exposure that is required by the dual lenses for photographing the first image is determined. Setting of the second lens is similar, and details are not repeatedly described in the present invention.

Certainly, in addition, exposure of the dual-lens device may also be set in another manner. For example, a preview image is photographed by using the first lens, and then exposure of the two lenses of the dual-lens device is set according to image scene identification of the preview image. For example, exposure of one of the two lenses is set to +2 EV to capture details in a shadow area of a scene, and exposure of the other lens is set to −2 EV to capture details in a highlight area of a scene.

A manner for setting light sensitivity is similar to the manner for setting the exposure, and details are not repeatedly described herein.

After the first processing parameter and the second processing parameter are determined, step S302 is performed.

In a process of implementing S302, when the dual-lens device is used for photographing, the first image sensor corresponding to the first lens captures the first image at the first moment according to the first processing parameter, and simultaneously, the second image sensor corresponding to the second lens captures the second image at the first moment according to the second processing parameter.

Specifically, after the first image and the second image are captured, a processor acquires the first image and the second image, and processes the first image and the second image.

In an actual application, the first image and the second image are LDR images, and the first image and the second image are captured in a same image capture area. That is, viewfinder frames of the dual lenses aim at a same area. Due to simultaneity of image acquiring, no ghost caused by a hand tremble and/or a movement of an object in a scene occurs in the first image and the second image. Therefore, "ghost" generated when images are synthesized by using a time-division multi-frame synthesis algorithm is eliminated.

For example, when a person rapidly waves a hand, the dual-lens device is used for acquiring an image. When the person waves the hand, the dual lenses simultaneously aim at this area to acquire a first image and a second image. Although the person in a photographed scene rapidly waves the hand, due to simultaneity of image acquiring of a left lens and a right lens, positions and gestures of the hand are completely the same. In this way, it is ensured from a source of HDR imaging that there is no ghost problem when a moving scene or a complex scene is photographed.

Similarly, due to the simultaneity of image acquisition of the left lens and the right lens, even if a handheld terminal becomes unsteady and trembles during photographing, the two lenses are completely the same in tremble directions and tremble amplitudes. Therefore, it is ensured from the source of HDR imaging that there is no ghost problem during the hand tremble.

Further, when the processor processes the first image and the second image, step S303 is performed.

In a process of implementing S303, when the photographing operation instruction is received, the processor synthesizes the acquired first image and the acquired second image to generate the image.

Optionally, the photographing operation instruction may be a photographing operation instruction generated when the user presses a physical button, or may be a photographing operation instruction generated when the user touches and holds a screen, or may be a photographing operation instruction generated when time that is set for photographing expires. A source of the photographing operation instruction is not limited in this application.

Optionally, the generated image is specifically a high dynamic range image.

Figure 5A:
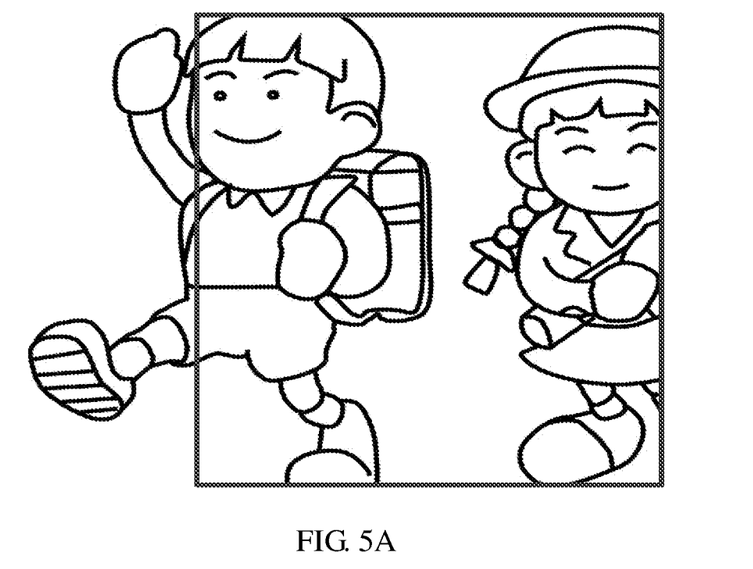
FIG. 5A is a schematic diagram of a first image according to an embodiment of the present invention.
Figure 5B:
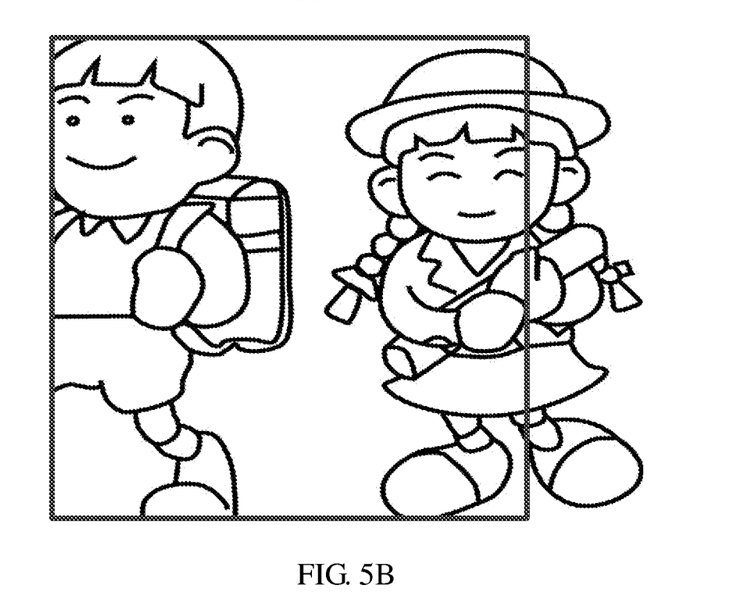
FIG. 5B is a schematic diagram of a second image according to an embodiment of the present invention.

In another embodiment of the present invention, a difference between installation positions of the two lenses results in different image areas of the acquired first image and the acquired second image. Because one lens is on the left side, and the other lens is on the right side, and although an optical center distance between the two lenses is not long, fields of view that the two lenses photograph are still different. For example, FIG. 5A is a schematic diagram of the acquired first image, and FIG. 5B is a schematic diagram of the acquired second image. In FIG. 5A and FIG. 5B, an enclosed area in the first image and the second image is a common part of the first image and the second image.

Figure 6:
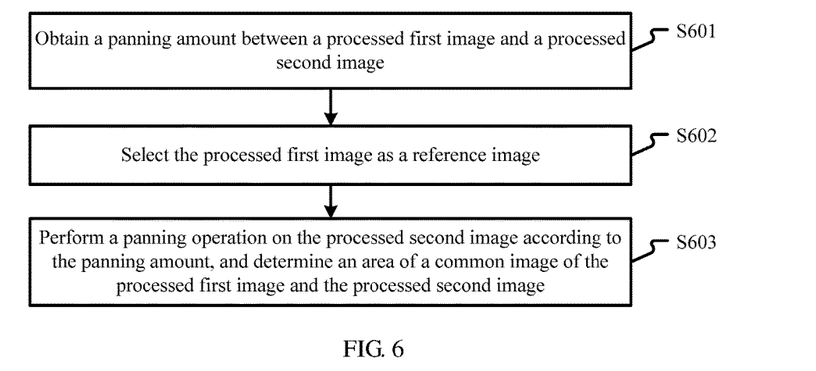
FIG. 6 is a flowchart of an image generating method according to another embodiment of the present invention.

Therefore, in another embodiment of the present invention, when the first image and the second image are synthesized, the following steps may further be performed. Referring to FIG. 6, the steps are specifically as follows.

S601. Obtain a panning amount between the processed first image and the processed second image.

Because the optical axes of the dual lenses are parallel, and relative installation positions are fixed and known, an image panning amount between the first image and the second image may be calculated according to the known relative positions, that is, the image panning amount may be calculated in advance before image photographing. Herein, the image panning amount may be obtained in the following manners:

Manner 1:

The panning amount is obtained by using $L=(f \times (t/d))/u$, where

L represents the panning amount between the processed first image and the processed second image, f represents a focal length, t represents an optical center distance between the first lens and the second lens, d represents a pixel size of the first image, where the pixel size of the first image is the same as a pixel size of the second image, and u represents a depth of field.

Manner 2:

Because there is a difference between actual values and theoretical values of t, f, and d, the following dual-lens calibration method may also be used, and is specifically as follows:

First, the first image sensor corresponding to the first lens captures the first image, and the second image sensor corresponding to the second lens captures the second image.

First, during capture, the first image sensor and the second image sensor may simultaneously perform chessboard capture, content displayed in the first image and content displayed in the second image are chessboards, and then the panning amount is obtained by means of measurement according to a difference between the chessboards in the first image and the second image. Then, the panning amount obtained by means of measurement is written into a compact-camera-module configuration table (the compact-camera-module configuration table may be stored in a ROM memory), and during photographing, the image panning amount between the first image and the second image is read on a basis of the configuration table.

An advantage of this manner lies in that because inconsistency of batch production may exist between different dual-lens modules, that is, a deviation from theoretical design, each group of dual-lens modules is calibrated before delivery, so that precision is high.

S602. Select the processed first image as a reference image.

S603. Perform a panning operation on the processed second image according to the panning amount, and determine an area of a common image of the processed first image and the processed second image.

After the panning operation is performed, the area of the common area of the processed first image and the processed second image may be determined.

Further, the processed first image and the processed second image may be synthesized according to the area of the common image of the processed first image and the processed second image, to generate the image.

That the processed first image and the processed second image are synthesized according to the area of the common image of the processed first image and the processed second image may be specifically: cropping according to the area of the common image of the processed first image and the processed second image area, and obtaining a cropped first image and a cropped second image; and then synthesizing the cropped first image and the cropped second image to generate the image.

In a process of implementing synthesis, image fusion may be performed by using a radiance-domain method or an image-domain method. In an actual case, image fusion includes multiple manners, and a specific manner for image fusion is not limited in the present invention.

In this embodiment of the present invention, a dual-lens device is used to resolve a ghost problem, and the dual-lens device includes a first lens and a second lens that are disposed on a same plane of the dual-lens device. Due to this dual-lens design, when images are simultaneously captured, no ghost caused by a hand tremble and/or a relative motion of an object in a scene occurs in a captured first image and a captured second image. Therefore, a technical problem of "ghost" caused when images are synthesized by using a time-division multi-frame synthesis algorithm is resolved, which has great importance to improving an HDR effect.

On a basis of a same invention conception, a dual-lens device is described in the following embodiments.

In another embodiment of the present invention, a dual-lens device is described.

Figure 7:
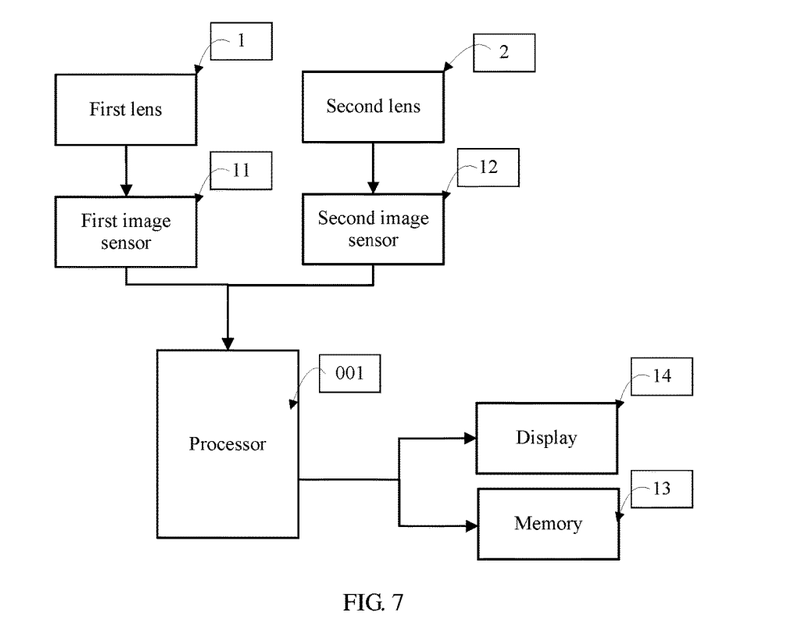
FIG. 7 is a structural diagram of a dual-lens device according to an embodiment of the present invention.

FIG. 7 is a structural diagram of a dual-lens device according to an embodiment of the present invention. As shown in FIG. 7, the dual-lens device includes a first lens 1 and a second lens 2 that are disposed on a same plane of the dual-lens device, a processor 001, a first image sensor 11 corresponding to the first lens 1, and a second image sensor 12 corresponding to the second lens 2.

The processor 001 is configured to determine a first processing parameter and a second processing parameter, where the first processing parameter is different from the second processing parameter. Specifically, the processor 001 is further configured to receive a user instruction, and preset the first processing parameter and the second processing parameter; and determine the first processing parameter according to a result of image scene identification that is performed before a first image is acquired, and determine the second processing parameter according to a result of image scene identification that is performed before a second image is acquired, where the first processing parameter includes first exposure or first light sensitivity, and the second processing parameter includes second exposure or second light sensitivity, where the first exposure is different from the second exposure, and the first light sensitivity is different from the second light sensitivity.

The first image sensor 11 corresponding to the first lens 1 is configured to capture the first image at a first moment according to the first processing parameter.

The second image sensor 12 corresponding to the second lens 2 is configured to capture the second image at the first moment according to the second processing parameter.

The processor 001 is further configured to: when a photographing operation instruction is received, synthesize the first image acquired by the first image sensor 11 corresponding to the first lens 1 and the second image acquired by the second image sensor 12 corresponding to the second lens 2, to generate an image. Specifically, the processor 001 may be configured to receive a photographing operation instruction generated when a user presses a physical button, or may be configured to receive a photographing operation instruction generated when a user touches and holds a screen, or may receive a photographing operation instruction generated when a set time expires.

Further, the dual-lens device further includes a memory 13, configured to store the image, the first processing parameter, and the second processing parameter; and a display 14, configured to display the generated image.

Figure 8:
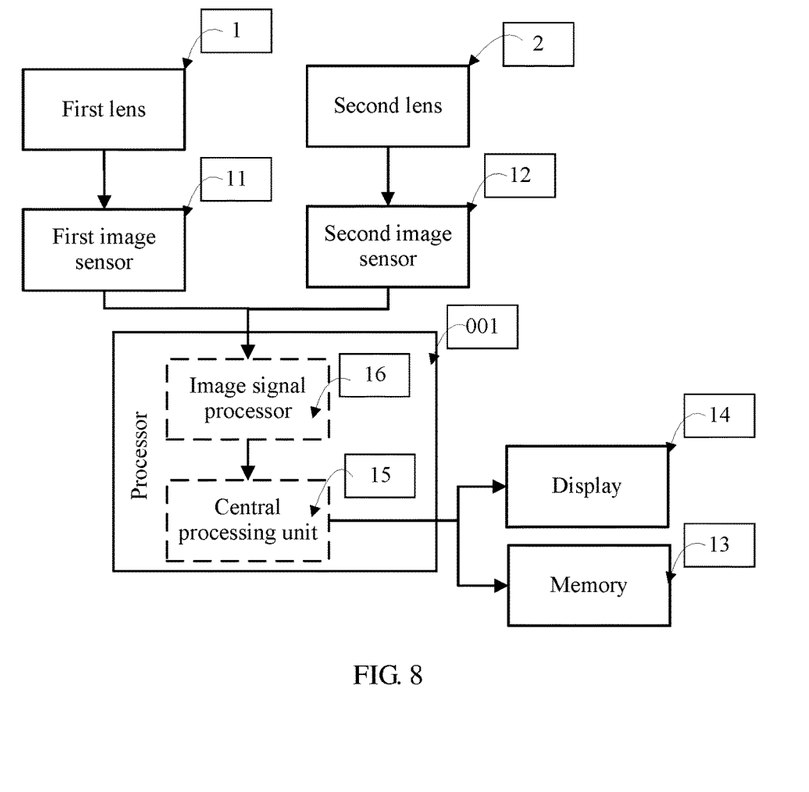
FIG. 8 is a structural diagram of a dual-lens device according to another embodiment of the present invention.

FIG. 8 is a structural diagram of a dual-lens device according to another embodiment of the present invention. As shown in FIG. 8, in another embodiment of the present invention, a processor 001 includes a central processing unit 15 and an image signal processor 16.

The central processing unit 15 is configured to: when a photographing operation instruction is received, synthesize an acquired first image captured by a first image sensor 11 corresponding to a first lens 1 and an acquired second image captured by a second image sensor 12 corresponding to a second lens 2, to generate an image.

The image signal processor 16 is configured to determine a first processing parameter and a second processing parameter, where the first processing parameter is different from the second processing parameter.

Figure 9:
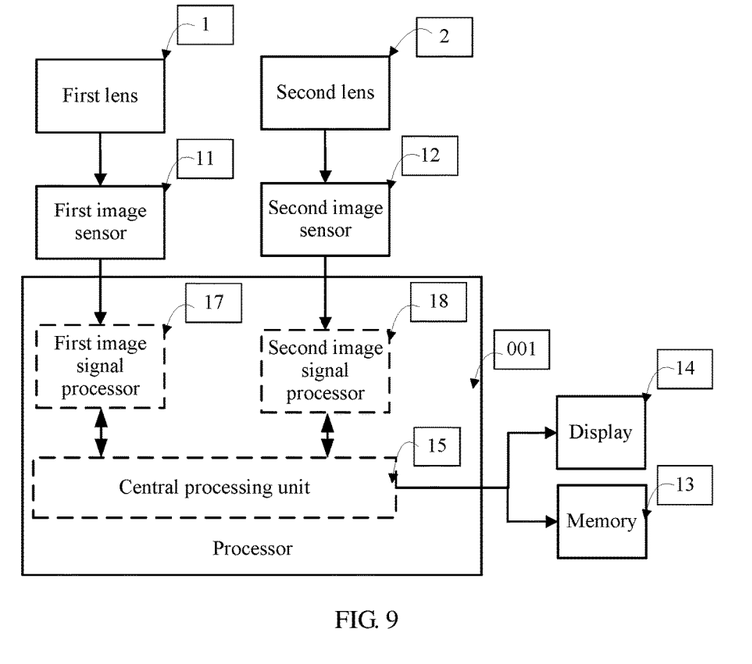
FIG. 9 is a structural diagram of a dual-lens device according to another embodiment of the present invention.

FIG. 9 is a structural diagram of a dual-lens device according to another embodiment of the present invention. As shown in FIG. 9, an image signal processor 16 specifically includes a first image processor 17 and a second image processor 18, where the first image processor 17 is configured to determine a first processing parameter, and the image signal processor 18 is configured to determine a second processing parameter, where the first processing parameter is different from the second processing parameter.

In another embodiment of the present invention, a central processing unit 15 is further configured to obtain a panning amount between a processed first image and a processed second image; select the processed first image as a reference image; and perform a panning operation on the processed second image according to the panning amount, and determine an area of a common image of the processed first image and the processed second image.

The image signal processor 16 may include the first image processor 17 and the second image processor 18.

Figure 10:
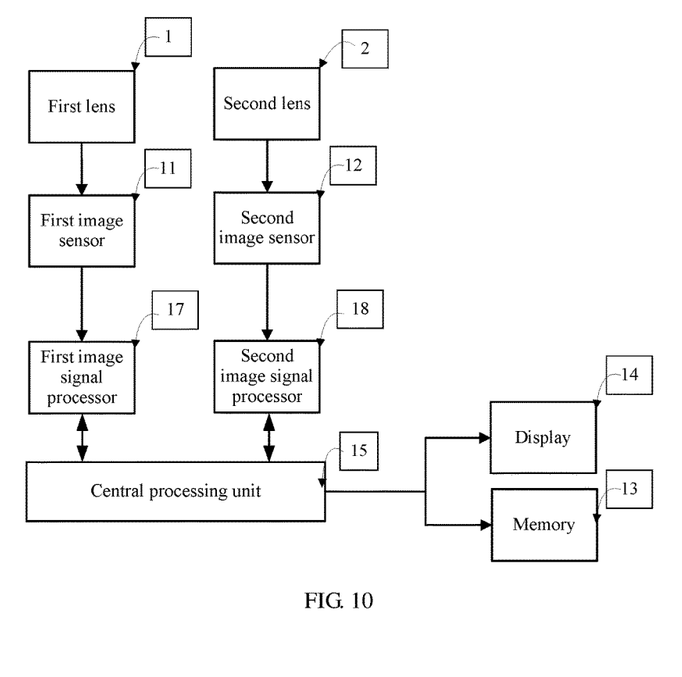
FIG. 10 is a structural diagram of a dual-lens device according to another embodiment of the present invention.

In another embodiment of the present invention, as shown in FIG. 10, a processor 001 is specifically a central processing unit 15 or an image signal processor 16.

When the processor 001 is specifically the central processing unit 15, the central processing unit 15 may implement all steps performed by the processor 001. When the processor 001 is specifically the image signal processor 16, the image signal processor 16 implements all steps performed by the processor 001. Specifically, the image signal processor 16 may further include a first image signal processor 17 and a second image signal processor 18.

A working principle of the dual-lens device is described by using an example in which the processor 001 is specifically the central processing unit 15.

The central processing unit 15 is configured to determine a first processing parameter and a second processing parameter. Optionally, the central processing unit 15 is configured to receive a user instruction, and preset the first processing parameter and the second processing parameter; or configured to determine the first processing parameter according to a result of image scene identification that is performed before a first image is acquired, and determine the second processing parameter according to a result of image scene identification that is performed before a second image is acquired, where the first processing parameter includes first exposure or first light sensitivity, and the second processing parameter includes second exposure or second light sensitivity, where the first exposure is different from the second exposure, and the first light sensitivity is different from the second light sensitivity.

A first image sensor 11 corresponding to a first lens 1 is configured to capture the first image at a first moment according to the first processing parameter determined by the central processing unit 15. Simultaneously, a second image sensor 12 corresponding to a second lens 2 is configured to capture the second image at the first moment according to the second processing parameter determined by the central processing unit 15.

The central processing unit 15 is configured to acquire the first image captured at the first moment by the first image sensor 11 corresponding to the first lens 1, and acquire the second image captured at the first moment by the second image sensor 12 corresponding to the second lens 2.

The central processing unit 15 is configured to: when a photographing operation instruction is received, synthesize the first image acquired by the first image sensor 11 corresponding to the first lens 1 and the second image acquired by the second image sensor 12 corresponding to the second lens 2, to generate an image. In a specific implementation process, the central processing unit 15 is further configured to obtain a panning amount between a processed first image and a processed second image; select the processed first image as a reference image; and perform a panning operation on the processed second image according to the panning amount, and determine an area of a common image of the processed first image and the processed second image; and then, synthesize the processed first image and the processed second image according to the area of the common image of the processed first image and the processed second image, to generate the image.

In another embodiment, a display 14 is configured to display the image that is obtained by means of synthesis by the central processing unit 15. A memory 13 is configured to store the image that is obtained by means of synthesis by the central processing unit 15, and in addition, the memory 13 is further configured to store the first processing parameter and the second processing parameter that are determined by the central processing unit 15.

When the processor 001 is the central processing unit 15, all steps performed by the central processing unit 15 may be performed by the image signal processor 16, or may be jointly performed by the central processing unit 15 and the image signal processor 16, where image signal processor 16 may include the first image signal processor 17 and the second image signal processor 18. Details are not repeatedly described in this embodiment of the present invention. The following technical effects can be achieved by using one or more embodiments of the present invention:

In the present invention, a dual-lens device is used to resolve a ghost problem, and the dual-lens device includes a first lens and a second lens that are disposed on a same plane of the dual-lens device. Due to this dual-lens design, when images are simultaneously captured, no ghost caused by a hand tremble and/or a relative motion of an object in a scene occurs in a captured first image and a captured second image. Therefore, a technical problem of "ghost" caused when images are synthesized by using a time-division multi-frame synthesis algorithm is resolved, which has great importance to improving an HDR effect.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or any other programmable data processing device, so that a series of operations and steps are performed on the computer or the any other programmable device, so as to generate computer-implemented processing. Therefore, the instructions executed on the computer or the any other programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the protection scope defined by the following claims and their equivalent technologies.

What is claimed is:

1. A method comprising:
   determining, by a dual-lens device, a first processing parameter and a second processing parameter, wherein the first processing parameter is different from the second processing parameter, and wherein the dual-lens device comprises a first lens and a second lens that are disposed on a same plane of the dual-lens device;
   acquiring, according to the first processing parameter, a first image captured at a first moment by a first image sensor corresponding to the first lens;
   acquiring, according to the second processing parameter, a second image captured at the first moment by a second image sensor corresponding to the second lens;
   receiving a photographing operation instruction; and
   in response to the photographing operation instruction, synthesizing, according to a panning amount between the first image and the second image, the first image and the second image to generate a third image, wherein the panning amount is obtained according to a focal length of the dual lens device, an optical center distance between the first lens and the second lens, a first pixel size of the first image, a second pixel size of the second image, and a depth of field of the dual lens device.

2. The method according to claim 1, wherein determining the first processing parameter and the second processing parameter comprises:

receiving a user instruction, and presetting the first processing parameter and the second processing parameter;

wherein the first processing parameter comprises first exposure or first light sensitivity, and the second processing parameter comprises second exposure or second light sensitivity; and wherein the first exposure is different from the second exposure, and the first light sensitivity is different from the second light sensitivity.

3. The method according to claim 1, wherein before synthesizing the first image and the second image to generate the third image, the method further comprises:

obtaining the panning amount between the first image and the second image;

selecting the first image as a reference image; and performing a panning operation on the second image according to the panning amount, and determining an area of a common image of the processed first image and the second image.

4. The method according to claim 3, wherein obtaining the panning amount between the first image and the second image comprises:

obtaining the panning amount based on a relation L=(f× (t/d))/u, wherein

L represents the panning amount between the first image and the second image, f represents the focal length of the dual lens device, t represents the optical center distance between the first lens and the second lens, d represents the first pixel size of the first image, wherein the first pixel size of the first image is equivalent to the second pixel size of the second image, and u represents the depth of field, of the dual lens device.

5. The method according to claim 3, wherein after determining the area of the common image of the first image and the second image, the method further comprises cropping the first image and the second image on a basis of the common image, and obtaining a cropped first image and a cropped second image.

6. The method according to claim 3, wherein synthesizing the first image and the acquired second image to generate the third image comprises synthesizing the first image and the second image according to the area of the common image of the first image and the second image, to generate the third image.

7. The method according to claim 1, wherein determining the first processing parameter and the second processing parameter comprises:

determining the first processing parameter according to a first result of first image scene identification that is performed before the first image is acquired, and determining the second processing parameter according to a second result of second image scene identification that is performed before the second image is acquired;

wherein the first processing parameter comprises first exposure or first light sensitivity, and the second processing parameter comprises second exposure or second light sensitivity; and wherein the first exposure is different from the second exposure, and the first light sensitivity is different from the second light sensitivity.

8. A dual-lens device comprising:
a first lens;
a second lens, wherein the first lens and the second lens are disposed on a same plane of the dual-lens device;
a processor;
a first image sensor corresponding to the first lens; and
a second image sensor corresponding to the second lens;
wherein the processor is configured to determine a first processing parameter and a second processing parameter, wherein the first processing parameter is different than the second processing parameter;

wherein the first image sensor corresponding to the first lens is configured to capture a first image at a first moment according to the first processing parameter;

wherein the second image sensor corresponding to the second lens is configured to capture a second image at the first moment according to the second processing parameter; and wherein the processor is further configured to synthesize, according to a panning amount between the first image and the second image, the first image and the second image to generate a third image, wherein the panning amount is obtained according to a focal length of the dual lens device, an optical center distance between the first lens and the second lens, a first pixel size of the first image, a second pixel size of the second image, and a depth of field of the dual lens device.

9. The dual-lens device according to claim 8, wherein the processor is further configured to receive a user instruction, and preset the first processing parameter and the second processing parameter;

wherein the first processing parameter comprises first exposure or first light sensitivity, and the second processing parameter comprises second exposure or second light sensitivity; and wherein the first exposure is different from the second exposure, and the first light sensitivity is different from the second light sensitivity.

10. The dual-lens device according to claim 9, wherein the processor comprises a central processing unit or an image signal processor.

11. The dual-lens device according to claim 9, wherein the processor comprises a central processing unit and an image signal processor.

12. The dual-lens device according to claim 8, wherein the processor is further configured to:

obtain the panning amount between the captured first image and the second image;

select the first image as a reference image; and perform a panning operation on the second image according to the panning amount, and determine an area of a common image of the first image and the second image.

13. The dual-lens device according to claim 12, wherein the processor is configured to synthesize the first image and the second image according to the area of the common image of the first image and the second image, to generate the third image.

14. The dual-lens device according to claim 8, wherein the processor is configured to determine the first processing parameter according to a first result of image scene identification that is performed before the first image is captured, and determine the second processing parameter according to a second result of image scene identification that is performed before the second image is captured;

wherein the first processing parameter comprises first exposure or first light sensitivity, and the second processing parameter comprises second exposure or second light sensitivity; and wherein the first exposure is different from the second exposure, and the first light sensitivity is different from the second light sensitivity.

15. A dual-lens device comprising:
a first lens;
a second lens, wherein the first lens and the second lens are disposed on a same plane of the dual-lens device;
a first image sensor corresponding to the first lens; and
a second image sensor corresponding to the second lens;
a processor; and
a non-transitory computer-readable storage medium storing a program to be executed by the processor, the program including instructions for:
  determining a first processing parameter and a second processing parameter, wherein the first processing parameter is different than the second processing parameter;
  receiving a first image at a first moment according to the first processing parameter, the first image having been captured by the first image sensor corresponding to the first lens;
  receiving a second image at the first moment according to the second processing parameter, the second image having been captured by second image sensor corresponding to the second lens;
  receiving a photographing operation instruction; and
  in response to receiving the photographing operation instruction:
    obtaining a panning amount between the first image and the second image, wherein the panning amount is a parameter preset in the non-transitory computer-readable storage medium and calibrated according to the first lens and the second lens before delivery of the dual-lens device;
    selecting the first image as a reference image;
    performing a panning operation on the second image according to the panning amount:
    determining an area of a common image of the first image and the second image; and
    synthesizing the first image and the second image to generate a third image according to the area of the common image of the first image and the second image.

16. The dual-lens device according to claim 15, wherein the processor comprises a central processing unit.

17. The dual-lens device according to claim 15, wherein the processor comprises an image signal processor.

18. The dual-lens device according to claim 15, wherein the instructions for determining the first processing parameter and the second processing parameter comprise instructions for:
  determining the first processing parameter according to a first result of first image scene identification that is performed before the first image is captured, wherein the first processing parameter comprises a first exposure or a first light sensitivity; and
  determining the second processing parameter according to a second result of second image scene identification that is performed before the second image is captured, wherein the second processing parameter comprises a second exposure or a second light sensitivity, wherein the first exposure is different from the second exposure, and wherein the first light sensitivity is different from the second light sensitivity.

19. The dual-lens device according to claim 15, wherein the program further includes instructions for:
  presetting the first processing parameter and the second processing parameter according to a user instruction, wherein the first processing parameter comprises first exposure or first light sensitivity, wherein the second processing parameter comprises second exposure or second light sensitivity, wherein the first exposure is different from the second exposure, and wherein the first light sensitivity is different from the second light sensitivity.

* * * * *

UNITED STATES PATENT AND TRADEMARK OFFICE
CERTIFICATE OF CORRECTION

PATENT NO. : 10,306,165 B2
APPLICATION NO. : 15/102226
DATED : May 28, 2019
INVENTOR(S) : Congchao Zhu It is certified that error appears in the above-identified patent and that said Letters Patent is hereby corrected as shown below:

In the Claims

In Column 14, Line 43, Claim 12, delete "panning amount between the captured first" and insert --panning amount between the first--.

Signed and Sealed this
Twenty-third Day of July, 2019

Andrei Iancu
*Director of the United States Patent and Trademark Office*